March 15, 1927.                                                 1,621,071
                    W. D. KINKADE ET AL
            PROCESS OF TREATING ACID SLUDGE TO PROVIDE A FUEL
                         Filed Jan. 8, 1927
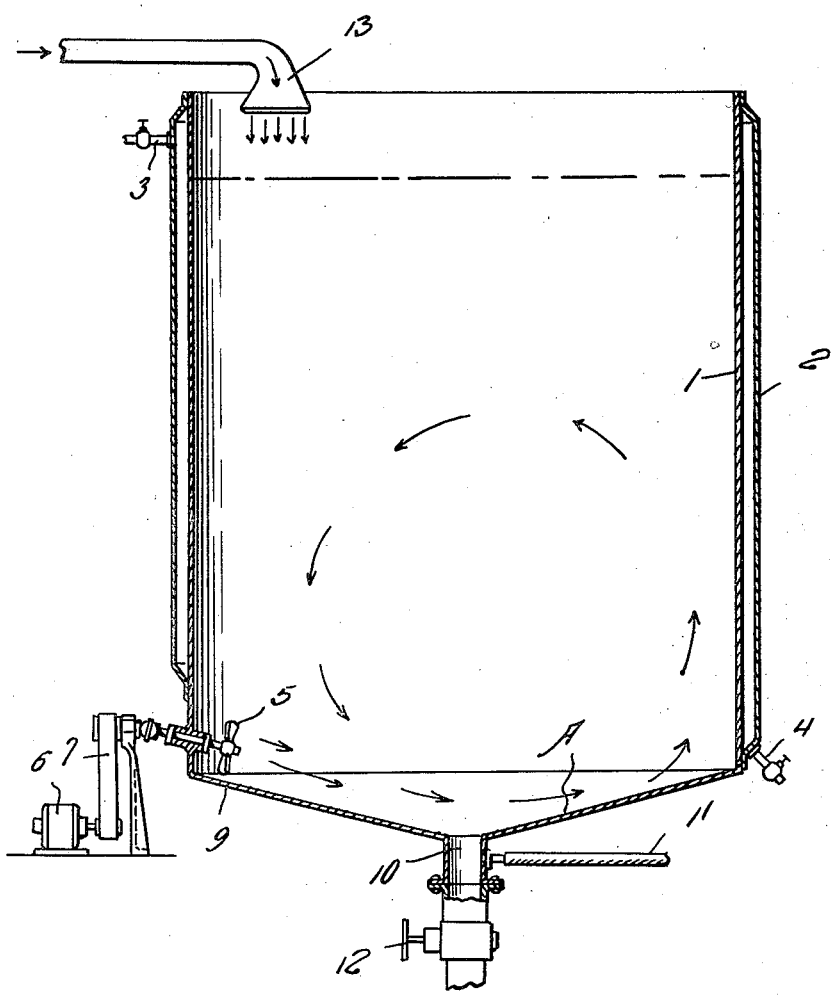
Inventors
W. D. Kinkade,
Charles J. Baugh,
By Clarence A. O'Brien
                    Attorney Patented Mar. 15, 1927.

1,621,071

UNITED STATES PATENT OFFICE.

WILLARD DUGLAS KINKADE AND CHARLES JOEL BAUGH, OF BARNSDALL, OKLAHOMA.

PROCESS OF TREATING ACID SLUDGE TO PROVIDE A FUEL.

Application filed January 8, 1927. Serial No. 159,995.

The present invention relates to improvements in the utilization of acid sludge as a fuel suitable for example for burning under boilers and for other purposes.

Despite the fact that numerous attempts have heretofore been made to utilize acid sludge produced in the refining of petroleum and its distillates, the great bulk of the acid sludge produced in such operation is at the present time considered as substantially a waste product, much of which is merely run into holes in the ground, to get rid of the same.

In accordance with the present invention, we have found out how to produce material from this acid sludge, which will be highly suitable as a fuel, and the object of the invention is to produce a fuel in an economical manner from the said sludge.

We give the following example of our process, but it will be understood that while in said example we refer to the acid sludge produced in the refining of cylinder stock, and while we mention therein certain proportions, temperatures and the like, the same may be varied considerably, and acid sludge from the treatment of other oils or distillates can likewise be employed.

To 100 barrels of the acid sludge resulting from the purification of cylinder oil, we add say 100 gallons of fuel oil, which may be a cheap petroleum oil, for example pressure tar, coming from high pressure cracking stills. The same may be mixed with heavy wax distillates or residuum. The sludge and the pressure tar and heavy wax distillates may be mixed at a temperature at which they are freely liquid and of relatively low viscosity, for example at 100 to 125° F.

We then add about 4 to 8% of a solution of soda ash of say 3 to 6 Bé. gravity. We also preferably add a small amount of lime at this stage. The total quantity of soda and of lime, taken together is however only a small fraction of the amount which would be necessary to completely neutralize the acidity of the sludge. The lime and soda are employed for the purpose of starting a chemical reaction which very greatly improves the mixing and subsequent operations. Thus when using 100 barrels of acid sludge from the purification of cylinder oil, 50 gallons of pressure tar and 50 gallons of waxy residuum or heavy wax distillates of petroleum, we preferably use about 700 pounds of quick lime and about 35 to 120 pounds of soda ash, these two together representing only a small fraction of the amounts of lime and soda ash that would be required for complete neutralization of the acidity of the sludge.

The process may be carried out in apparatus such as is shown conventionally in the accompanying drawing in which the figure represents diagrammatically a jacketed mixing kettle, provided with a cone shaped bottom, and an outlet at the bottom. In said drawing 1 represents the side walls of the mixing receptacle, 2 represents a steam jacket surrounding said receptacle, into which steam or superheated steam may be admitted, at 3, and condensates may be drawn off at 4 in the well known manner. At 5 is shown an agitating device consisting of a propeller mounted upon a suitable shaft, for example a flexible shaft as indicated, operated by any suitable source of power as an electric motor 6 and belt 7. The agitator is preferably situated a little above the bottom of the mixing tank, so that for example the lower end of the blade of the mixing device is about 8 inches above the bottom 9 of the said receptacle. The agitator is preferably so located that the flow therefrom will strike the conical bottom 9 at a point between the outlet 10 and the far side of the receptacle, for example this may strike at about the point A indicated in the drawing. The circulation of the liquid in the tank may be approximately as illustrated by the arrows in the drawing.

During the agitation of the charge in the mixing tank, steam is preferably introduced into the jacket 2, in order to raise the temperature of the charge up to about 200° F., or say to between 180 and 212° F. At 11 is shown a pipe leading from a source of compressed air or compressed gas (either hot or cold) through which air may be introduced into the bottom of the charge of material, to assist in the circulation, and also to assist in carrying off and vaporizing water from the mixture of materials being agitated. This pipe is also of importance if the agitator should break down during the early part of the mixing operation, in which case the current of air bubbling through the mass would keep the mass agitated and prevent settling out of the heavier from the lighter liquids.

When the mixing has been sufficiently accomplished, say after agitating as indicated for two to four hours, the valve 12 can be opened and the mixture then drawn off, for use as fuel. The mixture will remain for a reasonable time without any special agitation. At 13 is shown an inlet pipe for introducing the materials into the tank 1.

We have above referred to using about equal parts of the fuel oil and sludge, but we call attention to the fact that these proportions can be substantially varied. With different kinds of sludge and different kinds of fuel oils which we have employed, we find that various proportions between 40:60 and 60:40 give satisfactory results.

We have above referred to the use of soda ash and lime as the alkaline material for starting the reaction, but we call attention to the fact that other alkaline materials can be employed, without departing from the spirit of the invention. Without the use of the small amount of alkali however it is difficult to produce any mixing and it is practically impossible to produce a complete mixing of the fuel oil with the sludge.

We claim:—

1. A process which comprises adding acid sludge from petroleum refining to a fuel oil, heating the same sufficiently to reduce the viscosity, mixing with amounts of soda and lime far less than the amounts thereof which would be necessary for neutralization of the acidity of the sludge, and well agitating the mixture, whereby an oil mixture suitable for use as a fuel is produced.

2. A process which comprises adding acid sludge from petroleum refining to a fuel oil, heating the same to about 100 to 125° F., to reduce the viscosity, mixing with amounts of soda and lime far less than the amounts thereof which would be necessary for neutralization of the acidity of the sludge, and well agitating the mixture, whereby an oil mixture suitable for use as a fuel is produced.

3. A process which comprises adding acid sludge from petroleum refining to a fuel oil, heating the same sufficiently to reduce the viscosity, mixing with amounts of soda and lime far less than the amounts thereof which would be necessary for neutralization of the acidity of the sludge, and well agitating the mixture, while carrying the temperature up to about 180 to 212° F., whereby an oil mixture suitable for use as a fuel is produced.

4. A process which comprises adding acid sludge from petroleum refining to a fuel oil, heating the same sufficiently to reduce the viscosity, mixing with amounts of soda and lime far less than the amounts thereof which would be necessary for neutralization of the acidity of the sludge, and well agitating the mixture, while carrying the temperature up to about 180 to 212° F., and blowing air through the mass, whereby an oil mixture suitable for use as a fuel is produced.

5. A process which comprises adding acid sludge from petroleum refining to a fuel oil, heating the same sufficiently to reduce the viscosity, mixing with a fraction of one percent of soda and about 1.5 to 3% of lime, such quantities of alkali being far less than the amounts which would be necessary for neutralization of the acidity of the sludge, and well agitating the mixture, whereby an an oil mixture suitable for use as a fuel is produced.

6. A process which comprises adding acid sludge from petroleum refining to a fuel oil, heating the same sufficiently to reduce the viscosity, mixing with small amounts of alkaline reagents, such amounts being far less than the amounts which would be necessary for neutralization of the acidity of the sludge, and well agitating the mixture, whereby an oil mixture suitable for use as a fuel is produced.

7. A process which comprises adding acid sludge from petroleum refining to a fuel oil, heating the same sufficiently to reduce the viscosity, mixing with a solution of soda ash and with lime, said alkalies being in combined amount substantially less than the amounts thereof which would be necessary for neutralization of the acidity of the sludge, and well agitating the mixture, whereby an oil mixture suitable for use as a fuel is produced.

8. A process which comprises adding acid sludge from the refining of cylinder oil and pressure tar and heavy wax-bearing mineral oil material, heating the same sufficiently to reduce the viscosity, mixing with amounts of soda and lime far less than the amounts thereof which would be necessary for neutralization of the acidity of the sludge, and well agitating the mixture, whereby an oil mixture suitable for use as a fuel is produced.

9. A process which comprises adding acid sluge from petroleum refining to a fuel oil in about equal amounts by volume, heating the same sufficiently to reduce the viscosity, mixing with amounts of soda and lime far less than the amounts thereof which would be necessary for neutralization of the acidity of the sludge, and well agitating the mixture, whereby an oil mixture suitable for use as a fuel is produced.

In testimony whereof we affix our signatures.

WILLARD DUGLAS KINKADE.
CHARLES JOEL BAUGH.